(12) United States Patent
Kanemitsu et al.

(10) Patent No.: US 12,446,132 B2
(45) Date of Patent: Oct. 14, 2025

(54) LED DRIVING DEVICE, LED LIGHT SOURCE DEVICE, AND VEHICLE ONBOARD DISPLAY DEVICE

(71) Applicant: ROHM CO., LTD., Kyoto (JP)

(72) Inventors: Ryosuke Kanemitsu, Kyoto (JP); Koji Katsura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 154 days.

(21) Appl. No.: 18/512,462

(22) Filed: Nov. 17, 2023

(65) Prior Publication Data

US 2024/0090100 A1 Mar. 14, 2024

Related U.S. Application Data

(63) Continuation of application No. PCT/JP2022/019522, filed on May 2, 2022.

(30) Foreign Application Priority Data

May 26, 2021 (JP) ................................. 2021-088083

(51) Int. Cl.
| | | |
|---|---|---|
| *H05B 45/30* | (2020.01) | |
| *H05B 45/325* | (2020.01) | |
| *H05B 45/345* | (2020.01) | |
| *H05B 45/50* | (2022.01) | |

(52) U.S. Cl.
CPC ........... *H05B 45/50* (2020.01); *H05B 45/325* (2020.01); *H05B 45/345* (2020.01)

(58) Field of Classification Search
CPC ...... H05B 45/10; H05B 45/30; H05B 45/325; H05B 45/345; H05B 45/50; H05B 47/10
See application file for complete search history.

(56) References Cited

U.S. PATENT DOCUMENTS

2018/0132321 A1* 5/2018 Lin ........................ H05B 45/10

FOREIGN PATENT DOCUMENTS

JP 201321117 1/2013

OTHER PUBLICATIONS

International Search Report and Written Opinion in International Appln. No. PCT/JP2022/019522, mailed on Jun. 7, 2022, 13 pages (with machine translation).

* cited by examiner

*Primary Examiner* — Jimmy T Vu
(74) *Attorney, Agent, or Firm* — Fish & Richardson P.C.

(57) ABSTRACT

An LED driving device includes: a plurality of LED terminals (LED1 to LED6 terminals) to have connected to them the cathodes of LEDs in a plurality of channels; a lowest voltage input terminal (MINSELIN); a lowest voltage output terminal (MINSELOUT); and a selector. When the lowest voltage input terminal is used, the selector selects the lowest among the voltages at the plurality of LED terminals and the voltage at the lowest voltage input terminal, to output the lowest voltage from the lowest voltage output terminal; when the lowest voltage input terminal is not used, the selector selects the lowest among the voltages at the plurality of LED terminals, to output the lowest voltage from the lowest voltage output terminal.

18 Claims, 7 Drawing Sheets

LED DRIVING DEVICE, LED LIGHT SOURCE DEVICE, AND VEHICLE ONBOARD DISPLAY DEVICE

CROSS-REFERENCE TO RELATED APPLICATIONS

This nonprovisional application is a continuation application of International Patent Application No. PCT/JP2022/019522 filed on May 2, 2022, which claims priority Japanese Patent Application No. 2021-088083 filed on May 26, 2021, the entire contents of which are hereby incorporated by reference.

TECHNICAL FIELD

The present disclosure relates to LED driving devices.

BACKGROUND ART

Today LEDs (light-emitting diodes), with their low power consumption and long lifetimes, are used in a variety of applications. An example of known LED driving devices for driving LEDs is seen in Patent Document 1 identified below.

The LED driving device of Patent Document 1 includes a DC/DC controller for controlling an output stage for generating from an input voltage an output voltage and supplying it to LEDs and a constant current driver for generating an output current to be passed through the LEDs. It drives LEDs in a plurality of channels. Each channel includes a plurality of LEDs connected in series, and the LEDs in different channels are connected in parallel.

The DC/DC controller includes an error amplifier that compares the lowest voltage among the cathode voltages of the LEDs in the plurality of channels with a reference voltage and a PWM comparator that compares the output of the error amplifier with a slope signal to generate an internal PWM signal.

The constant current driver is turned on and off based on an external PWM signal input to a PWM terminal. In this way, PWM dimming is performed. During the period in which the constant current driver on, the error amplifier and the PWM comparator so operate that a switching element in the output stage is PWM-driven with switching pulses such that the lowest cathode voltage mentioned above is equal to the reference voltage. In this way, the output voltage (the anode voltage of the LEDs) is controlled to be equal to the sum of the highest voltage among the forward voltages of the LEDs in the plurality of channels and the reference voltage.

CITATION LIST

Patent Literature

Patent Document 1: JP-A-2013-21117

DESCRIPTION OF EMBODIMENTS

1. Configuration of an LED Driving Device

Figure 1:
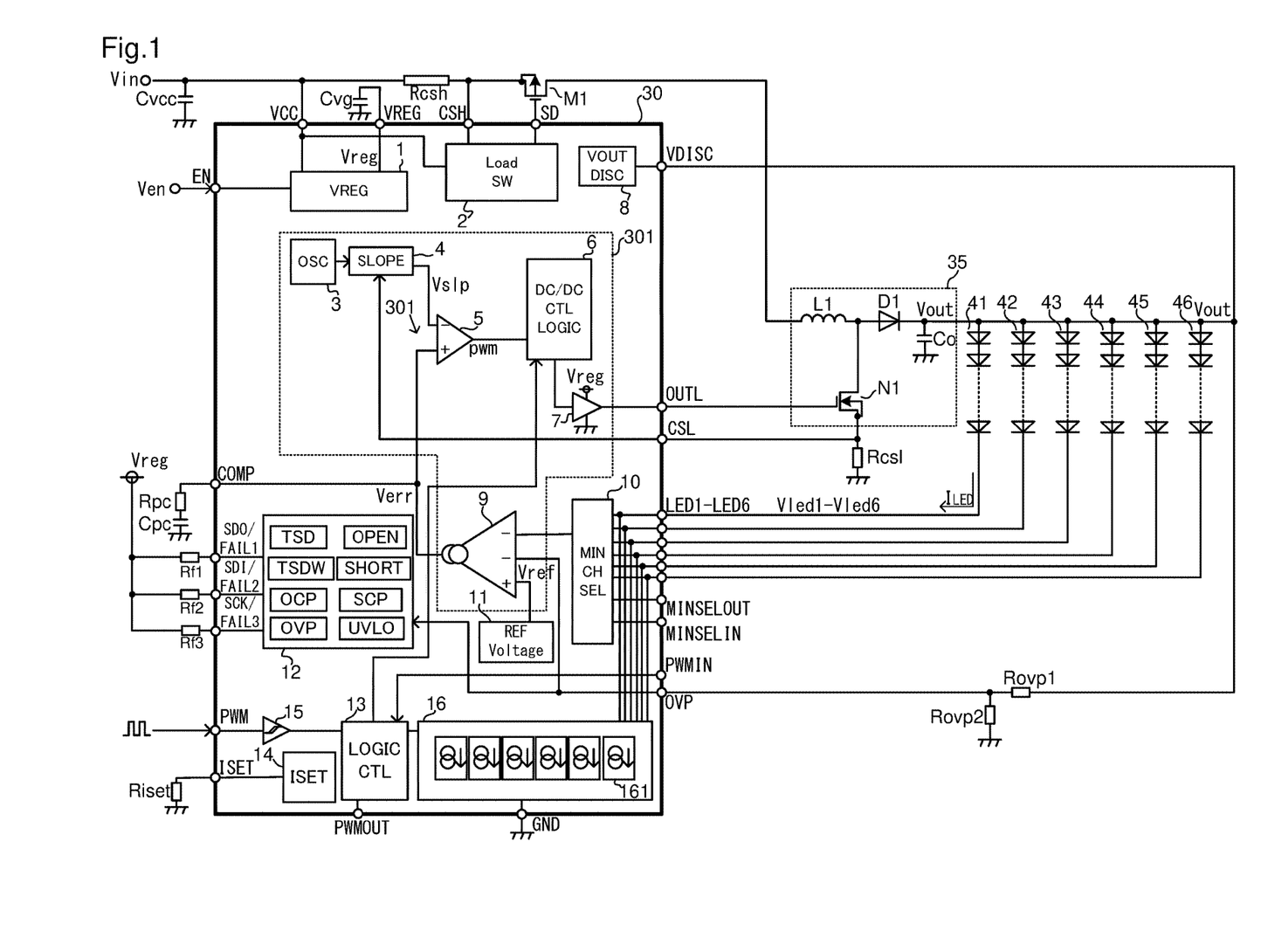
FIG. 1 is a diagram showing the configuration of an LED driving device according to an illustrative embodiment.

FIG. 1 is a diagram showing the configuration of an LED driving device 30 according to an illustrative embodiment of the present disclosure. The LED driving device 30 shown in FIG. 1 drives LED arrays 41 to 46 in a plurality of channels (in the example under discussion, six channels as one example). Note that FIG. 1 shows a configuration for driving LEDs with a single LED driving device 30, while it is also possible, as will be described later, to configure a system that drives LEDs in multiple channels with a plurality of LED driving devices 30.

The LED driving device 30 is a semiconductor device having integrated in it an internal voltage generator 1, a current sensor 2, an oscillator 3, a slope generator 4, a PWM comparator 5, a DC/DC control logic circuit 6, a driver 7, an output discharger 8, an error amplifier 9, a selector 10, a reference voltage generator 11, a protection circuit 12, a logic circuit 13, an LED current setter 14, a Schmitt trigger 15, and a constant current driver 16.

The LED driving device 30 also has, as external terminals for establishing electrical connection with the outside, a VCC terminal, a VREG terminal, a CSH terminal, an SD terminal, a VDISC terminal, an OUTL terminal, a CSL terminal, LED1 to LED6 terminals, a MINSELOUT terminal, a MINSELIN terminal, a PWMIN terminal, an OVP terminal, a GND terminal, a PWMOUT terminal, a ISET terminal, a PWM terminal, FAIL1 to FAIL3 terminals, a COMP terminal, and an EN terminal. As will be described later, when in the LED driving device 30 a function for communicating with an external microprocessor is enabled, the terminal FAIL1 functions as an SDO terminal, the terminal FAIL2 as an SDI terminal, and the terminal FAIL3 as an SCK terminal.

Outside the LED driving device 30, an output stage 35 is arranged that generates from an input voltage Vin an output voltage Vout by DC/DC conversion and feeds the output voltage Vout to the anodes of the LED arrays 41 to 46. The output stage 35 includes a switching element N1, a diode D1, an inductor L1, and an output capacitor Co. The switching element N1 is driven and controlled by the LED driving device 30 and thereby the output stage 35 is controlled by the LED driving device 30. The output stage 35 and the LED driving device 30 together constitute a DC/DC converter. In the embodiment under discussion, the DC/DC converter is configured specifically as a boosting (stepping-up) DC/DC converter.

An application terminal for the input voltage Vin is connected to one terminal of a capacitor Cvcc, to the VCC terminal, and to one terminal of a resistor Rcsh. The other terminal of the capacitor Cvcc is connected to a ground terminal. The other terminal of the resistor Rcsh is connected to the CSH terminal and to the source of a transistor M1, which is configured as a p-channel MOSFET. The drain of the transistor M1 is connected to one terminal of the inductor L1. The gate of the transistor M1 is connected to the SD terminal. The other terminal of the inductor L1 is connected to the anode of the diode D1 and to the drain of the switching element N1, which is configured as an n-channel MOSFET. The source of the switching element N1 is connected via a resistor Rcsl to the ground terminal. The gate of the switching element N1 is connected to the OUTL terminal. The cathode of the diode D1 is connected to one terminal of the output capacitor Co. The other terminal of the output capacitor Co is connected to the ground terminal. At one terminal of the output capacitor Co, the output voltage Vout appears.

The switching element N1 and the resistor Rcsl may be included in the LED driving device 30.

To one terminal of the output capacitor Co at which the output voltage Vout appears, the anodes of the LED arrays 41 to 46 are connected. The LED arrays 41 to 46 are each composed of a plurality of LEDs connected in series. The anodes of all the LED arrays 41 to 46 are connected to the LED1 to LED6 terminals respectively.

The LED arrays 41 to 46 may each be composed of, instead of LEDs connected in series, for example, LEDs connected in series and in parallel, or a single LED. The number of LED arrays (number of channels) that can be driven is not limited to six, and may instead be, for example, four.

Next, the internal configuration of the LED driving device 30 will be described.

When an enable signal Ven input to the EN terminal is logically high, the internal voltage generator 1 generates from the input voltage Vin input to the VCC terminal an interval voltage Vreg (e.g., 5 V) to output it from the VREG terminal. The interval voltage Vreg is used as a supply voltage for internal circuits in the LED driving device 30. To the VREG terminal, a capacitor Cvg is connected.

To the current sensor 2, the CSH and SD terminals are connected.

The oscillator 3 generates a predetermined clock signal to feed it to the slope generator 4.

Based on the clock signal fed from the oscillator 3, the slope generator 4 generates a slope signal (triangular-wave signal) Vslp to feed it to the PWM comparator 5. The slope generator 4 also has a function of offsetting the slope signal Vslp according to the voltage at the CSL terminal, which results from the current through the switching element N1 being converted with the resistor Rcsl.

The PWM comparator 5 compares an error signal Verr, which is fed to its non-inverting input terminal (+), with the slope signal Vslp, which is fed to its inverting input terminal (−), to generate an internal PWM signal pwm to feed it to the DC/DC control logic circuit 6.

Based on the internal PWM signal pwm, the DC/DC control logic circuit 6 generates a driving signal for the driver 7.

Based on the driving signal fed from the DC/DC control logic circuit 6, the driver 7 generates a gate voltage for the switching element N1 in the form of pulses oscillating between the interval voltage Vreg and the ground voltage.

The switching element N1 is turned on and off based on the gate voltage fed from the driver 7.

The LED1 to LED6 terminals are fed with LED terminal voltages Vled1 to Vled6 as the cathode voltages of the LED arrays 41 to 46 respectively. The selector 10 selects the lowest voltage among the LED terminal voltages Vled1 to Vled6 to feed it to one inverting input terminal (−) of the error amplifier 9. As will be described later, when the MINSELIN terminal is used, the selector 10 selects the lowest voltage among the LED terminal voltages Vled1 to Vled6 and the voltage at the MINSELIN terminal.

The other inverting input terminal (−) of the error amplifier 9 is fed with the voltage at the OVP terminal, which results from the output voltage Vout being divided with voltage division resistors Rovp1 and Rovp2. The non-inverting input terminal (+) of the error amplifier 9 is fed with a reference voltage Vref generated by the reference voltage generator 11. The error amplifier 9 outputs an error amplifier output current (a source current or a sink current) corresponding to the difference between whichever is lower of the voltages fed to its two inverting input terminals (−) and the reference voltage Vref. Only at start-up is feedback control performed based on the OVP terminal to expedite start-up and, after start-up, feedback control is performed based on the output of the selector 10.

The output terminal of the error amplifier 9 is connected to the COMP terminal. The COMP terminal is connected, via a resistor Rpc and a capacitor Cpc connected in series outside, to a ground terminal. At the COMP terminal, the error signal Verr appears. The error signal Verr is fed to the non-inverting input terminal (+) of the PWM comparator 5.

The protection circuit 12 includes a TSD circuit, a TSDW (thermal warning) circuit, an OCP circuit, an OVP circuit, an LED open detection circuit (OPEN), an LED short-circuit detection circuit (SHORT), an output short-circuit protection circuit (SCP), and an UVLO circuit.

The TSD circuit shuts down circuits other than the internal voltage generator 1 if the junction temperature in the LED driving device 30 becomes, for example, equal to or higher than 175° C. The TSD circuit restores circuit operation if the junction temperature in the LED driving device 30 becomes, for example, equal to 150° C. The TSDW circuit issues a warning if the junction temperature in the LED driving device 30 becomes, for example, equal to or higher than 140° C.

The OCP circuit monitors the voltage at the CSL terminal (an input current sense voltage), which results from the current through the switching element N1 being converted with the resistor Rcsl, and activates overcurrent protection if the voltage at the CSL terminal becomes, for example, equal to or higher than the 0.3 V. When activating overcurrent protection, the OCP circuit suspends DC/DC switching.

To the SD terminal, the gate of the transistor M1 is connected. If the current sensor 2 senses an overcurrent in the resistor Rcsh (an overcurrent in the inductor L1), it turns the transistor M1 off and shuts off the path from the application terminal for the input voltage Vin to the inductor L1.

The OVP circuit monitors the voltage at the OVP terminal, and activates overvoltage protection if the voltage at the OVP terminal becomes, for example, equal to or higher than 1.0 V. When activating overvoltage protection, DC/DC switching is suspended.

If any of the LED terminal voltages Vled1 to Vled6 is, for example, equal to or lower than 0.3 V and in addition the voltage at the OVP terminal is, for example, equal to or higher than 1.0 V, the LED open detection circuit (OPEN) recognizes LED open detection, so that only the LED array that is detected to be open is latched off (the constant current circuit 161 in the corresponding channel in the constant current driver 16 is turned off).

If any of the LED terminal voltages Vled1 to Vled6 is, for example, equal to or higher than 4.5 V, the LED short-circuit detection circuit (SHORT) makes an incorporated counter start counting and, at the lapse of about 13 ms after that, effects latching, so that only the LED array that is detected to be short-circuited is latched off (the constant current circuit 161 in the corresponding channel in the constant current driver 16 is turned off).

If the voltage at the OVP terminal becomes, for example, equal to or lower than 0.25 V, or if any of the LED terminal voltages Vled1 to Vled6 becomes, for example, equal to or lower than 0.3 V, the output short-circuit protection circuit (SCP) makes an incorporated counter start counting and, at the lapse of about 13 ms after that, effects latching so as to shut down circuits other than the internal voltage generator 1. The output short-circuit protection circuit can cope with both a ground short circuit at the anode side (DC/DC output side) of the LED arrays 41 to 46 and a ground short circuit at the cathode side of the LED arrays 41 to 46.

If the input voltage Vin becomes, for example, equal to or lower than 2.8 V, or if the interval voltage Vreg becomes, for example, equal to or lower than 2.7 V, the UVLO circuit shuts down circuits other than the internal voltage generator 1.

Based on the fault detection state of the TSDW circuit, the protection circuit 12 outputs a fault detection signal from the terminal FAIL1 to the outside. To the terminal FAIL1, the VREG terminal is connected via a resistor Rf1. If the TSDW circuit detects a fault, the protection circuit 12 turns on an unillustrated transistor connected to the terminal FAIL1 to make the output at the terminal FAIL1 low.

Moreover, based on the fault detection states of the LED open detection circuit, the LED short-circuit detection circuit, and the output short-circuit protection circuit (SCP), the protection circuit 12 outputs a fault detection signal from the terminal FAIL2 to the outside. To the terminal FAIL2, the VREG terminal is connected via a resistor Rf2. If any of the TSD circuit, the OCP circuit, the LED open detection circuit, the LED short-circuit detection circuit, and the output short-circuit protection circuit (SCP) detects a fault, the protection circuit 12 turns on an unillustrated transistor connected to the terminal FAIL2 to make the output at the terminal FAIL2 low.

The Schmitt trigger 15 transmits a PWM dimming signal, which is input to the PWM terminal from the outside, to the logic circuit 13. The PWM dimming signal is fed in in the form of a pulse signal. Based on the PWM dimming signal, the logic circuit 13 feeds the constant current driver 16 with PWM dimming instructions. In this way, PWM dimming of the LEDs is performed.

The LED current setter 14 sets in the constant current driver 16 a constant current value corresponding to the resistance value of a resistor Riset connected to the ISET terminal (current setting terminal).

The constant current driver 16 includes constant current circuits 161 corresponding to six channels arranged between the LED1 to LED6 terminals, respectively, and the GND terminal, which is connected to a ground terminal. The logic circuit 13 turns on and off the constant current circuits 161 according to the duty of the PWM dimming signal. Specifically, it keeps the constant current circuits 161 in the on state for an LED current on period in accordance with the on-duty of the PWM dimming signal, and keeps the constant current circuits 161 in the off state for an LED current off period in accordance with the on-duty of the PWM dimming signal. When the constant current circuits 161 are in the on state, an LED current ILED passes with the constant current value set by the LED current setter 14.

Incidentally, when the constant current circuit 161 in any channel is in the on state, the logic circuit 13 instructs the DC/DC control logic circuit 6 to perform DC/DC operation and, when the constant current circuits 161 in all the channels are in the off state, the logic circuit 13 instructs the DC/DC control logic circuit 6 to suspend DC/DC operation. This is because, if DC/DC operation is suspended with the constant current circuit 161 in any channel on, the output capacitor Co discharges and the output voltage Vout falls, possibly causing a failure in the lighting of LEDs.

The VDISC terminal is connected to the output discharger 8. The VDISC terminal is connected to one terminal of the output capacitor Co at which the output voltage Vout appears. Starting up with electric charge remaining in the output capacitor Co may cause the LEDs flicker. To prevent that, at start-up, the output capacitor Co needs to be discharged. Here, considering that, with the discharge path across the OVP setting resistors Rovp1 Rovp2 etc. alone, the electric charge may take time to be discharged, the output discharger 8 discharges the electric charge remaining in the output capacitor Co. This discharging takes place while the DC/DC converter is off (at the fall of the enable signal Ven fed to the EN, or when protection is in effect).

The LED driving device 30 has a communication function for communication with an external microprocessor. The communication function can employ, for example, I2C communication or SPI communication. To enable the communication function, the FAIL1 to FAIL3 terminals are connected to the external microprocessor (unillustrated). Here, the terminal FAIL1 functions as an SDO terminal (data output terminal), the terminal FAIL2 as an SDI terminal (data input terminal), and the terminal FAIL3 as a SCK terminal (clock terminal). The communication function can be enabled and disabled according to whether the FAIL1 to FAIL3 terminals are pulled up.

With the communication function enabled, the logic circuit 13 turns on and off the constant current circuits 161 channel by channel according to channel-by-channel PWM dimming settings (on-duty settings) that are set from the external microprocessor. Thus, PWM dimming can be performed for the LEDs channel by channel. Incidentally, with the communication function enabled, the protection circuit 12 indicates a fault to the external microprocessor through communication.

The MINSELIN, MINSELOUT, PWMIN, and PWMOUT terminals are not used when a single LED driving device 30 is used as shown in FIG. 1, and are used when a plurality of LED driving devices 30 are used as described later; their description will therefore be given later.

2. DC/DC Converter

The LED driving device 30 includes a DC/DC controller 301 (the circuit block including the oscillator 3, the slope generator 4, the PWM comparator 5, the DC/DC control logic circuit 6, the driver 7, and the error amplifier 9), which will now be described in detail.

The error amplifier 9 generates an error amplifier output current according to the difference between whichever is lower of the lowest value among the LED terminal voltages Vled1 to Vled6 selected by the selector 10 and the voltage at the OVP terminal with the reference voltage Vref. The error amplifier output current behaves, if the lower voltage just mentioned is lower than the reference voltage Vref, as a source current and, if the lower voltage just mentioned is higher than the reference voltage Vref, as a sink current.

The PWM comparator 5 generates the internal PWM signal pwm by comparing the error signal Verr with the slope signal Vslp. The internal PWM signal pwm is, if the error signal Verr is higher than the slope signal Vslp, at high level and, if the error signal Verr is lower than the slope signal Vslp, at low level.

The DC/DC control logic circuit 6 turns the switching element N1 on and off based on the internal PWM signal pwm. Specifically, when the internal PWM signal pwm is at high level, the DC/DC control logic circuit 6 keeps the switching element N1 on; when the internal PWM signal pwm is at low level, the DC/DC control logic circuit 6 keeps the switching element N1 off.

Thus, a feedback controller constituted by the error amplifier 9, the PWM comparator 5, the DC/DC control logic circuit 6, and the driver 7 performs feedback control by feeding switching pulses from the OUTL terminal to the switching element N1 such that the lowest value among the LED terminal voltages Vled1 to Vled6 is equal to the reference voltage Vref. Thus, the DC/DC controller 301 includes a feedback controller as described above.

When the switching element N1 turns on, a current passes across a path from the application terminal for the input voltage Vin via the resistor Rcsh, the transistor M1, the inductor L1, and the switching element N1 to the ground terminal, so that energy is stored in the inductor L1. Meanwhile, the diode D1 remains reverse-biased, and thus no current passes from the output capacitor Co into the switching element N1. If electric charge has been stored in the output capacitor Co, an LED current ILED passes from the output capacitor Co to the anodes of the LED arrays 41 to 46.

When the switching element N1 turns off, the energy stored in the inductor L1 is released; thus a current passes, as the LED current ILED, into the LED arrays 41 to 46 and also into the output capacitor Co, so that the output capacitor Co is charged.

While the operation described above is repeated, the anodes of the LED arrays 41 to 46 are fed with the output voltage Vout, which results from the input voltage Vin being boosted. Meanwhile, the cathode voltage of the LED array in the channel with the highest forward voltage is controlled to be equal to the reference voltage Vref, and the cathode voltages of the LED arrays in the other channels are controlled to be equal to or higher than the reference voltage Vref.

3. Using a Plurality of LED Driving Devices

Figure 2:
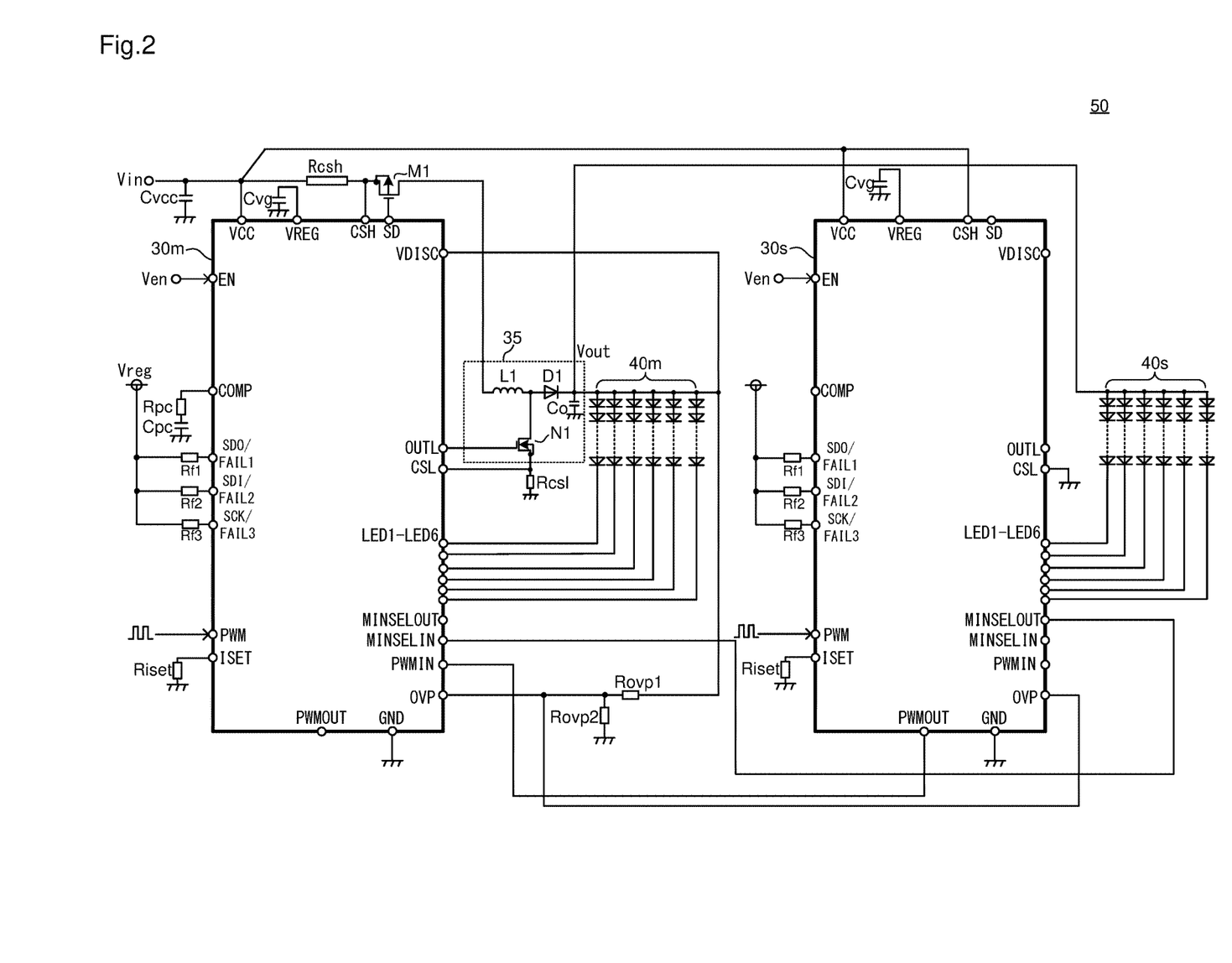
FIG. 2 is a diagram showing a configuration example of an LED light source device including two LED driving devices.

A plurality of LED driving devices 30 configured as described above can be used to drive LEDs in multiple channels. FIG. 2 is a diagram showing an LED light source device 50 that includes two LED driving devices 30. The LED light source device 50 shown in FIG. 2 includes an LED driving device 30m as a master, an LED driving device 30s as a slave, an output stage 35, a master-side LED light source 40m, and a slave-side LED light source 40s.

The LED light source 40m is composed of LED arrays in six channels. The number of channels of LED arrays in the LED light source 40m is not limited to six (the same is true with the LED light source 40s). The cathodes of the LED arrays in the LED light source 40m are connected to the LED1 to LED6 terminals, respectively, of the LED driving device 30m. The output voltage Vout appearing at one end of the output capacitor Co in the output stage 35 is fed to the anodes of the LED arrays in the LED light source 40m.

The LED light source 40s is composed of LED arrays in six channels. The cathodes of the LED arrays in the LED light source 40s are connected to the LED1 to LED6 terminals, respectively, of the LED driving device 30s. One end of the output capacitor Co in the output stage 35 is connected to the anodes of the LED arrays in the LED light source 40s. Thus, the output voltage Vout can be fed to the anode of the LED light source 40s.

In the LED driving device 30s as the slave, the DC/DC controller 301 is not used. Accordingly, the OUTL and CSL terminals of the LED driving device 30s are left unused.

The OVP terminal of the LED driving device 30s as the slave is connected to the OVP terminal of the LED driving device 30m as the master. Thus, the overvoltage protection by the OVP circuit and the ground-short protection by the output short-circuit protection circuit (SCP) can be performed in both the master and the slave.

Moreover, as shown in FIG. 2, the MINSELOUT terminal of the LED driving device 30s is connected to the MINSELIN terminal of the LED driving device 30m. The selector 10 (FIG. 1) in the LED driving device 30 outputs, from the MINSELOUT terminal, the lowest voltage among the voltages at the LED1 to LED6 terminals and the voltage at the MINSELIN terminal. In a case where, as in the LED driving device 30s in FIG. 2, the MINSELIN terminal is not used, the lowest voltage among the voltages at the LED1 to LED6 terminals is output from the MINSELOUT terminal.

On the other hand, in the LED driving device 30m as the master, the lowest voltage among the voltages at the LED1 to LED6 terminals and the voltage at the MINSELIN terminal is selected by the selector 10 and is fed to the error amplifier 9, to be used in the DC/DC control by the DC/DC controller 301.

Thus, from the MINSELOUT terminal of the LED driving device 30s shown in FIG. 2, the lowest voltage among the voltages at the LED1 to LED6 terminals in the LED driving device 30s (hereinafter the slave-side lowest voltage) is output. And in the LED driving device 30m, the lowest voltage among the voltages at the LED1 to LED6 terminals and the slave-side lowest voltage input to the MINSELIN terminal is selected by the selector 10 and is fed to the error amplifier 9.

Thus, the DC/DC controller 301 in the LED driving device 30m and the output stage 35 generate the output voltage Vout such that the lowest voltage among the cathode voltages of the LED arrays in the 12 channels (6 channels×2) in the LED light sources 40m and 40s is equal to the reference voltage Vref. In this way, the LED terminal voltage (cathode voltage) corresponding to, among the LED arrays in 12 channels, the one with the highest forward voltage is controlled to be equal to the reference voltage Vref and the other LED terminal voltages are controlled to be voltages equal to or higher than voltage Vref.

Moreover, as shown in FIG. 2, the PWMOUT terminal of the LED driving device 30s is connected to the PWMIN terminal of the LED driving device 30m.

Here, if any of the constant current circuits 161 in six channels is in the on state, or if an on/off state signal input to the PWMIN terminal indicates the on state, the logic circuit 13 (FIG. 1) in the LED driving device 30 outputs from the PWMOUT terminal an on/off state signal at a first logic level (e.g., high level) indicating the on state. By contrast, if all the constant current circuits 161 in six channels are in the off state and in addition the on/off state signal input to the PWMIN terminal indicates the off state, the logic circuit 13 outputs from the PWMOUT terminal an on/off state signal at a second logic level (e.g., low level) indicating the off state.

When the PWMIN terminal is left unused, the output from the PWMOUT terminal is effected with no regard to the signal input to the PWMIN terminal.

On the other hand, in the oscillator 30*m* as the master, if any of the constant current circuits 161 in six channels is in the on state, or if the on/off state signal input to the PWMIN terminal indicates the on state, the logic circuit 13 instructs the DC/DC control logic circuit 6 to keep DC/DC control on. By contrast, if all the constant current circuits 161 in six channels are in the off state and in addition the on/off state signal input to the PWMIN terminal indicates the off state, the logic circuit 13 instructs the DC/DC control logic circuit 6 to keep DC/DC control off. With DC/DC control on, the DC/DC controller 301 and the output stage 35 generate the output voltage Vout; with DC/DC control off, the generation of the output voltage Vout is suspended.

In the configuration shown in FIG. 2, the PWMIN terminal of the LED driving device 30*s* is left unused, and thus an on/off state signal corresponding to the on/off states of the constant current circuits 161 in six channels in the LED driving device 30*s* is output from the PWMOUT terminal.

Figure 3:
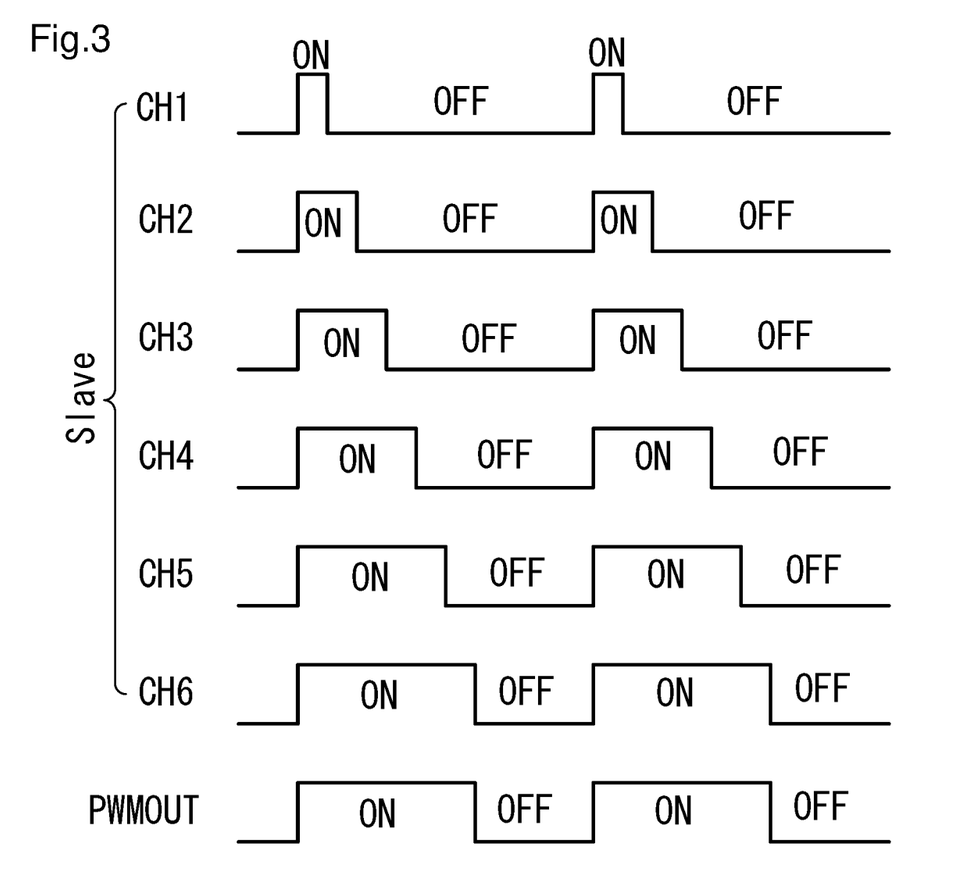
FIG. 3 is a timing chart showing one example of the on/off states of constant current circuits in six channels in an LED driving device (slave) and an on/off state signal output from a PWMOUT terminal.

Here, FIG. 3 shows one example of the on/off states of the constant current circuits 161 in six channels (CH1 to CH6) in the LED driving device 30*s* (slave) and the on/off state signal output from the PWMOUT terminal. Note that FIG. 3 shows an example where a communication function for communication with an external microcomputer as mentioned earlier is enabled and where channel-by-channel PWM dimming settings are made through communication (the same is true with FIG. 4, which will be referred to later). It is thus possible, as shown in FIG. 3, to vary the on-duty from channel to channel. While in FIG. 3 the timing of the transition from the off to on state coincides among the six channels, this need not be so (the same is true with FIG. 4, which will be referred to later).

As shown in FIG. 3, if any of the constant current circuits 161 in six channels is in the on state, the on/off state signal is at the first logic level (on level); if all the constant current circuits 161 in six channels are in the off state, the on/off state signal is at the second logic level (off level).

As described above, the on/off state signal output from the PWMOUT terminal of the LED driving device 30*s* is input to the PWMIN terminal of the LED driving device 30*m*. Here, FIG. 4 shows one example of the on/off states of the constant current circuits 161 in six channels (CH1 to CH6) in the LED driving device 30*m* (master), the on/off state signal input to the PWMIN terminal (which is similar to the one at PWMOUT in FIG. 3), and the state of DC/DC control in the LED driving device 30*m*.

Figure 4:
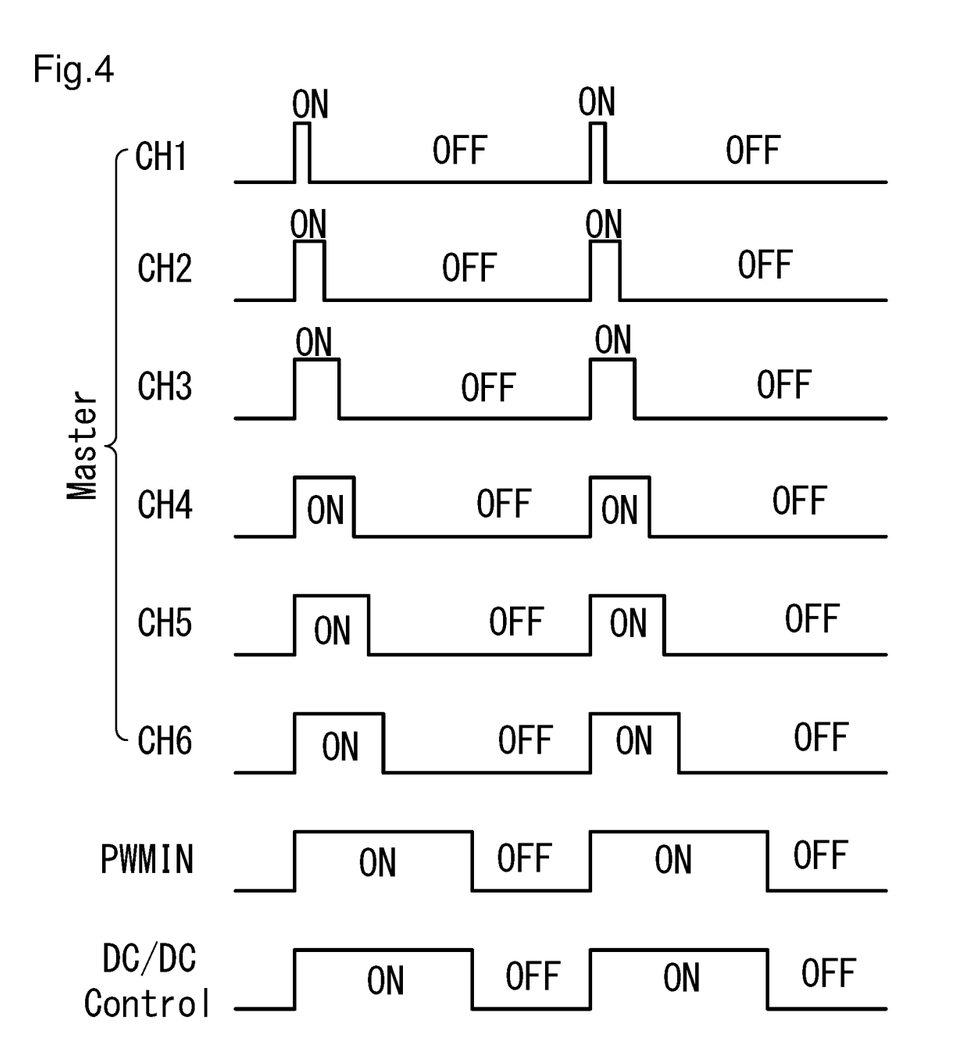
FIG. 4 is a timing chart showing one example of the on/off states of constant current circuits in six channels in an LED driving device (master), an on/off state signal input to the PWMIN terminal, and the state of DC/DC control in the LED driving device (master).

As shown in FIG. 4, if any of the constant current circuits 161 in the six channels is in the on state, or if the on/off state signal indicates the on state, DC/DC control is in the on state; if all the constant current circuits 161 in six channels are in the off state and in addition the on/off state signal indicates the off state, DC/DC control is in the off state.

Thus, if any of the constant current circuits 161 in 12 channels in the master and the slave is in the on state, the DC/DC controller 301 in the LED driving device 30*m* as the master and the output stage 35 generate the output voltage Vout; if all the constant current circuits 161 in 12 channels are in the off state, the generation of the output voltage Vout is suspended.

In this way, the MINSELOUT and MINSELIN terminals can be used to transmit information on the lowest voltage among the LED terminal voltages from the slave side to the master side. Moreover, the PWMOUT and PWMIN terminals can be used to transmit information on the on/off states of the constant current circuits 161 from the slave side to the master side. Thus, with the DC/DC controller 301 on the master side and the output stage 35, the output voltage Vout fed to the LEDs in all the channels in the master and the slave can be controlled. This eliminates the need to provide output stages 35 one in each of a plurality of LED driving devices 30, and helps suppress an increase in the number of components. It is thus possible to reduce the cost and the circuit area.

Moreover, transmitting information on the on/off states of the constant current circuits 161 from the slave side to the master side allows the slave side to make channel-by-channel PWM dimming settings without relying on the master side, leading to enhanced flexibility in dimming.

If a ground short circuit occurs at the cathode of an LED array in the slave-side LED light source 40*s*, 0 V is output from the MINSELOUT terminal of the LED driving device 30*s*. In the master-side LED driving device 30*m*, the output short-circuit protection circuit (SCP) can be configured to monitor not only the LED terminal voltages Vled1 to Vled6 but also the MINSELIN terminal; then it is possible, if 0 V is input to the MINSELIN terminal, to shut down circuits other than the internal voltage generator 1 in the LED driving device 30*m*. In this way, even if a ground short circuit occurs at a cathode in the slave-side LED light source 40*s*, generation of the output voltage Vout can be suspended.

If a short circuit occurs in an LED array in the slave-side LED light source 40*s*, its occurrence cannot be conveyed from the MINSELOUT terminal of the LED driving device 30*s* to the LED driving device 30*m*. However, in that case, the LED short-circuit detection circuit (SHORT) in the LED driving device 30*s* turns off only the constant current circuit 161 that corresponds to the LED detected to have the short circuit; thus continuing to generate the output voltage Vout does not pose a problem. It is thus possible to keep LEDs lit as a function associated with functional safety.

Moreover, while in FIG. 2 the number of LED driving devices 30 used is two, three or more of them may be used. In that case, to the LED driving device 30*m* as the master are connected, in stages successively succeeding it, two or more LED driving devices 30*s* as slaves.

In that case, any LED driving device 30*s* as a slave except the one in the last stage has its MINSELIN terminal connected to the MINSELOUT terminal of the LED driving device 30 in the succeeding stage, and has its MINSELOUT terminal connected to the MINSELIN terminal of the LED driving device 30 in the preceding stage. Likewise, any LED driving device 30*s* as a slave except the one in the last stage has its PWMIN terminal connected to the PWMOUT terminal of the LED driving device 30 in the succeeding stage, and has its PWMOUT terminal connected to the PWMIN terminal of the LED driving device 30 in the preceding stage. In the LED driving device 30*s* in the last stage, the MINSELIN and PWMIN terminals are left unused.

4. Modified Examples

Figure 5:
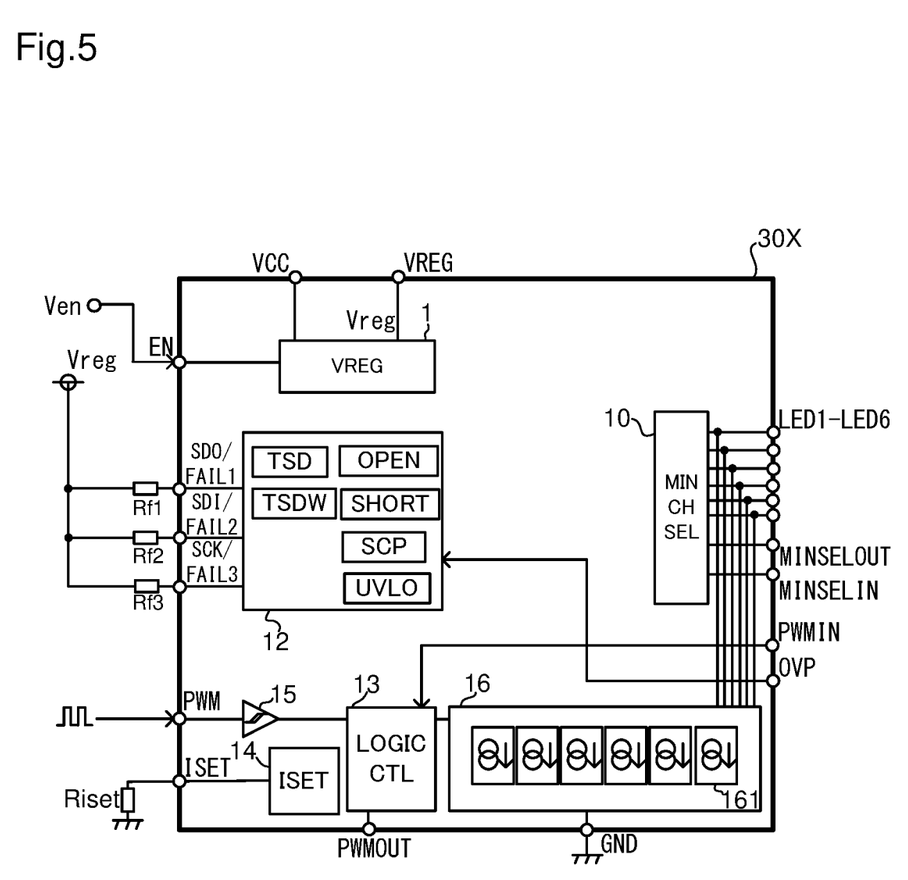
FIG. 5 is a diagram showing a configuration example of an LED driving device dedicated for use as a slave.

In a configuration where a plurality of LED driving devices are used, an LED driving device 30X dedicated for use as a slave as shown in FIG. 5 may be used. Compared with the LED driving device 30 (FIG. 1) described previously, the LED driving device 30X shown in FIG. 5 lacks the DC/DC controller 301. That is, the LED driving device 30X is an IC device dedicated to serve as a constant current driver. This gives the LED driving device 30X a smaller size than the LED driving device 30.

Figure 6:
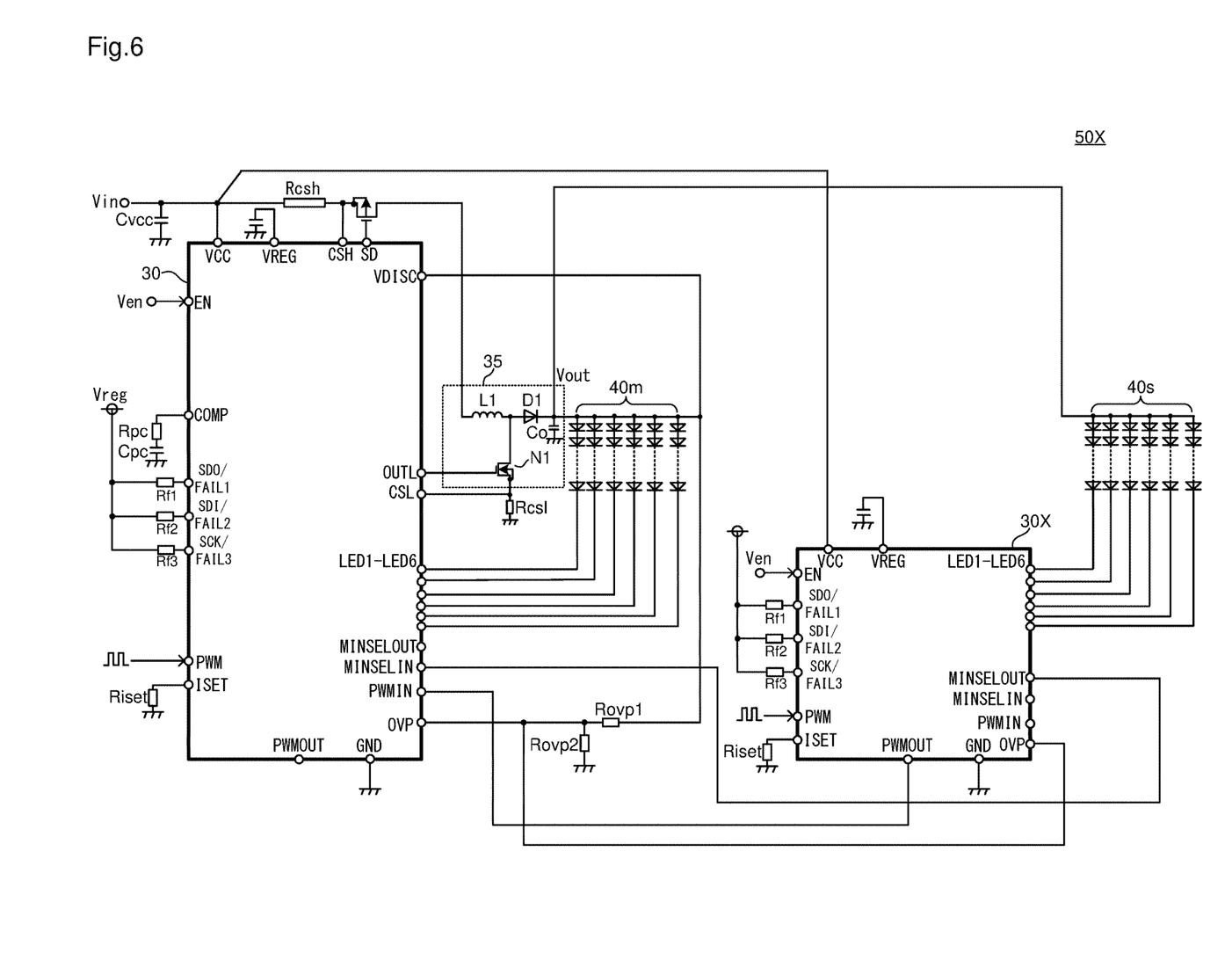
FIG. 6 is a diagram showing a configuration example of an LED light source device employing an LED driving device dedicated for use as a slave.

FIG. 6 is a diagram showing the configuration of an LED light source device 50X employing an LED driving device 30X dedicated for use as a slave as described above. The LED light source device 50X shown in FIG. 6 uses the LED driving device 30 as a master. The MINSELOUT terminal in the LED driving device 30X is connected to the MINSELIN terminal in the LED driving device 30, and the PWMOUT terminal in the LED driving device 30X is connected to the PWMIN terminal in the LED driving device 30. Thus, as in the embodiment described previously, information on the lowest voltage among the LED terminal voltages and information on the on/off states of the constant current circuits 161 can be transmitted from the slave side to the master side.

With the LED light source device 50X described above, not only does it require only one output stage 35, its use of the smaller-sized LED driving device 30X helps further reduce the circuit area. It should however be noted that the LED light source device 50 (FIG. 2) described previously permits use of a single product for any LED driving device 30 regardless of whether it is a master or a slave, and this makes the management of LED driving devices 30s easy.

5. Application to a Backlight Device

Figure 7:
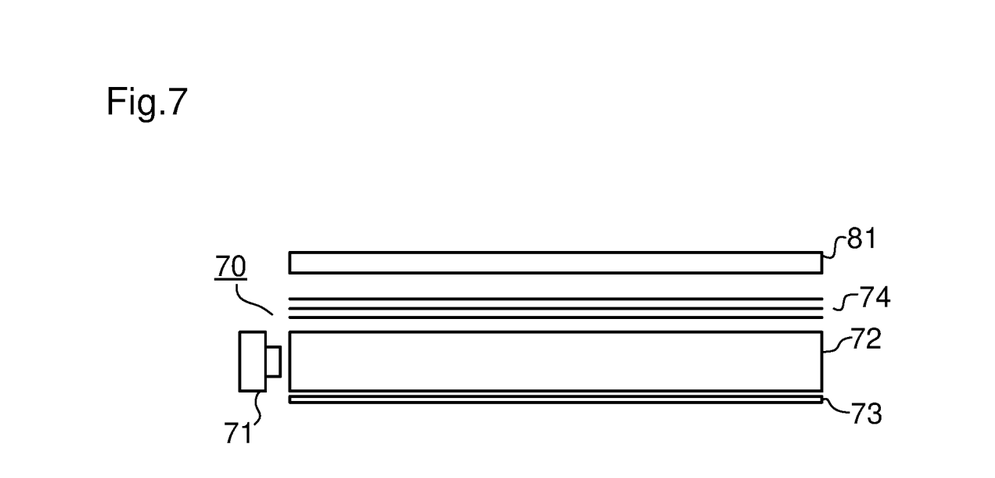
FIG. 7 is a diagram showing a configuration example of a backlight device.

As one example of the target of application of any LED driving device according to the embodiment described above, a backlight device will be described. An example of the structure of a backlight device to which the LED driving device is applicable is shown in FIG. 7. While the structure shown in FIG. 7 is of what is called an edge-lit type, this is not meant as any limitation; a structure of a direct-lit type may instead be adopted.

The backlight device 70 shown in FIG. 7 is a lighting device that illuminates a liquid crystal panel 81 from behind. The backlight device 70 includes an LED light source device 71, a light guide plate 72, a reflector plate 73, and an optical sheet and the like 74. The LED light source device 71 includes LEDs and a circuit board on which they are mounted. The light emitted from the LED light source device 71 enters the light guide plate 72 through a side face of it. Formed of, for example, a plate of acrylic resin, the light guide plate 72 guides, by totally reflecting it, the light that has entered light guide plate 72 all over its interior, eventually letting the light emerge as planar light from the light guide plate 72 through its face at the side where the optical sheet and the like 74 are arranged. The reflector plate 73 reflects the light leaking out of the light guide plate 72 back into it. The optical sheet and the like 74 include a diffuser sheet, a lens sheet, and the like, and serve to uniformize and improve the brightness of the light that illuminates the liquid crystal panel 81. The LED light source device 71 can be implemented with the LED light source device 50 or 50X described previously. This helps produce the liquid crystal panel 81 in larger sizes.

6. Vehicle Onboard Display

A backlight device incorporating an LED driving device according to the embodiment described previously can suitably be incorporated, in particular, in a vehicle onboard display.

Figure 8:
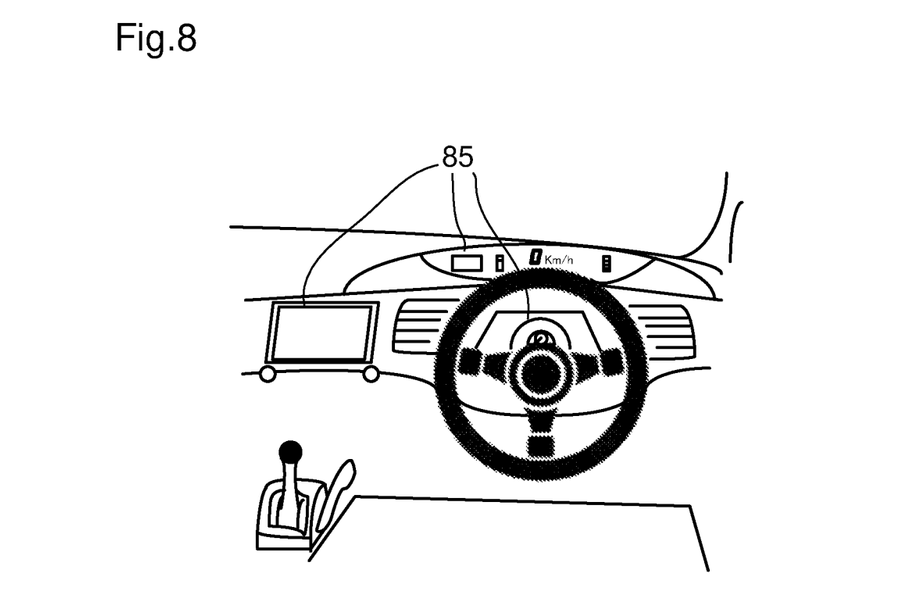
FIG. 8 is a diagram showing one example of a vehicle onboard display.

A vehicle onboard display is arranged, for example like the vehicle onboard display 85 shown in FIG. 8, on a dashboard in front of the driver's seat in a vehicle. The vehicle onboard display 85 displays, for example, car navigation information, a shot image rearward of the vehicle, and various images such as images of a speedometer, a fuel level indicator, a fuel consumption indicator, and a shift position indicator, and can convey various kinds of information to the user. Such a vehicle onboard display is called a cluster panel or a center information display (CID). The vehicle onboard display may instead be one for rear entertainment that is arranged on a rear face of the driver's seat or the front passenger's seat.

7. Modifications

While an illustrative embodiment of the present invention has been described above, it allows for various modifications without departure from the spirit of the present invention.

8. Notes

As described above, according to one aspect of what is disclosed herein, an LED driving device (30) includes: a plurality of LED terminals (LED1 to LED6 terminals) to have connected to them the cathodes of LEDs (41 to 46) in a plurality of channels respectively; a lowest voltage input terminal (MINSELIN); a lowest voltage output terminal (MINSELOUT); and a selector (10).

When the lowest voltage input terminal is used, the selector selects the lowest voltage among the voltages at the plurality of LED terminals and the voltage at the lowest voltage input terminal, to output the lowest voltage from the lowest voltage output terminal.

When the lowest voltage input terminal is not used, the selector selects the lowest voltage among the voltages at the plurality of LED terminals, to output the lowest voltage from the lowest voltage output terminal. (A first configuration.)

In the first configuration described above, there may be further provided a DC/DC controller (301) that controls an output stage (35) for generating an output voltage (Vout) from an input voltage (Vin) and feeding the output voltage to the anodes of the LEDs in the plurality of channels.

The DC/DC controller may operate so as to keep, among the voltages at the plurality of LED terminals and the voltage at the lowest voltage input terminal, the lowest voltage selected by the selector equal to a reference voltage (Vref). (A second configuration.)

In the second configuration described above, there may be further provided a ground short-circuit protection circuit (SCP) that, on detecting a ground short circuit at the cathode of any of the LEDs based on the voltage at the lowest voltage input terminal, suspends the operation of the DC/DC controller. (A third configuration.)

In any of the first to third configurations described above, there may be further provided:
constant current circuits (161) that feed currents to the LEDs in the plurality of channels respectively; and
an LED short-circuit detection circuit (SHORT) that, on detecting a short circuit in any of the LEDs based on the voltages at the LED terminals, turns off the corresponding one of the constant current circuits. (A fourth configuration.)

In any of the first to fourth configurations described above, there may be further provided: constant current circuits (161) that feed currents to the LEDs in the plurality of channels respectively; an on/off state input terminal (PWMIN terminal); an on/off state output terminal (PWMOUT terminal); and an on/off state signal feeder (logic circuit 13).

When the on/off state input terminal is used,
if any of the constant current circuits is in the on state or if an on/off state signal input to the on/off state input terminal indicates the on state, the on/off state signal feeder outputs from the on/off state output terminal an on/off state signal indicating the on state and
if all the constant current circuits are in the off state and in addition the on/off state signal input to the on/off state input terminal indicates the off state, the on/off state signal feeder outputs from the on/off state output terminal an on/off state signal indicating the off state.

When the on/off state input terminal is not used,
if any of the constant current circuits is in the on state, the on/off state signal feeder outputs from the on/off state output terminal an on/off state signal indicating the on state and
if all the constant current circuits are in the off state, the on/off state signal feeder outputs from the on/off state output terminal an on/off state signal indicating the off state. (A fifth configuration.)

In the fifth configuration described above, there may be further provided: a DC/DC controller (301) that controls an output stage (35) for generating an output voltage (Vout) from an input voltage (Vin) and feeding the output voltage to the anodes of the LEDs in the plurality of channels; and an DC/DC operation on/off controller (logic circuit 13).
If any of the constant current circuits is in the on state or if the on/off state signal input to the on/off state input terminal indicates the on state, the DC/DC operation on/off controller makes the DC/DC controller perform DC/DC operation.
If all the constant current circuits are in the off state and in addition the on/off state signal input to the on/off state input terminal indicates the off state, the DC/DC operation on/off controller makes the DC/DC controller suspend the DC/DC operation. (A sixth configuration.)

In the fifth or sixth configuration described above, the constant current circuits may be capable of being turned on and off based on channel-by-channel PWM dimming settings acquired through communication with the outside. (A seventh configuration.)

According to another aspect of what is disclosed herein, an LED light source device (50) includes: an output stage (35) that generates an output voltage (Vout) from an input voltage (Vin);
an LED driving device (30m) according to any of the first to seventh configurations as a master, including a DC/DC controller (301) for controlling the output stage;
at least one LED driving device (30s) according to any of the first to seventh configurations as a slave;
a first LED light source (40m) provided to correspond to the LED driving device as the master; and
a second LED light source (40s) provided to correspond to the at least one LED driving device as the slave.
The output voltage is fed to the anode of the first LED light source and to the anode of the second LED light source.
Each of the at least one LED driving device as the slave is connected in the stage succeeding the LED driving device as the master or another of the at least one LED driving device as the slave.
A lowest voltage output terminal (MINSELOUT) of each of the at least one LED driving device as the slave is connected to a lowest voltage input terminal (MINSELIN) of another of the at least one LED driving device as the slave in a preceding stage or the LED driving device as the master. (An eighth configuration.)

In the LED light source device of the eighth configuration described above, the at least one LED driving device (30X) as the slave may include no DC/DC controller. (A ninth configuration.)

In the eighth or ninth configuration described above, the LED driving device as the master and the at least one LED driving device as the slave may each include: an overvoltage detection terminal (OVP terminal); and an open protection circuit (OPEN) that performs LED open protection based on the voltage at the overvoltage detection terminal. The overvoltage detection terminal of the at least one LED driving device as the slave is connected to the overvoltage detection terminal of the LED driving device as the master. (A tenth configuration.)

According to yet another aspect of what is disclosed herein, a lighting device (70) includes the LED light source device of any of the eighth to tenth configurations described above. (An eleventh configuration.)

According to still another aspect of what is disclosed herein, a vehicle onboard display device 85 includes the lighting device of the eleventh configuration described above. (A twelfth configuration.)

INDUSTRIAL APPLICABILITY

The present disclosure finds applications in, for example, drivers for vehicle onboard LEDs.

REFERENCE SIGNS LIST 1 internal voltage generator
2 current sensor
3 oscillator
4 slope generator
5 PWM comparator
6 DC/DC control logic circuit
7 driver
8 output discharger
9 error amplifier
10 selector
11 reference voltage generator
12 protection circuit
13 logic circuit
14 LED current setter
15 Schmitt trigger
16 constant current driver
30, 30X LED driving device
30m, 30s LED driving device
35 output stage
40m, 40s LED light source
50, 50X LED light source device
70 backlight device
71 LED light source device
72 light guide plate
73 reflector plate
74 optical sheet and the like
81 liquid crystal panel
85 vehicle onboard display
161 constant current circuit
301 DC/DC controller
Co output capacitor
D1 diode
L1 inductor
N1 switching element

The invention claimed is:

1. An LED driving device, comprising:
a plurality of LED terminals to have connected thereto cathodes of LEDs in a plurality of channels respectively;
a lowest voltage input terminal;
a lowest voltage output terminal; and
a selector,
wherein
when the lowest voltage input terminal is used, the selector selects a lowest voltage among voltages at the plurality of LED terminals and a voltage at the lowest voltage input terminal, to output the lowest voltage from the lowest voltage output terminal, and
when the lowest voltage input terminal is not used, the selector selects a lowest voltage among the voltages at the plurality of LED terminals, to output the lowest voltage from the lowest voltage output terminal.

2. The LED driving device according to claim 1, further comprising a DC/DC controller that controls an output stage for generating an output voltage from an input voltage and feeding the output voltage to anodes of the LEDs in the plurality of channels,
wherein
the DC/DC controller operates so as to keep, among the voltages at the plurality of LED terminals and the voltage at the lowest voltage input terminal, the lowest voltage selected by the selector equal to a reference voltage.

3. The LED driving device according to claim 2, further comprising a ground short-circuit protection circuit that, on detecting a ground short circuit at a cathode of any of the LEDs based on the voltage at the lowest voltage input terminal, suspends operation of the DC/DC controller.

4. The LED driving device according to claim 1, further comprising:
constant current circuits that feed currents to the LEDs in the plurality of channels respectively; and
an LED short-circuit detection circuit that, on detecting a short circuit in any of the LEDs based on the voltages at the LED terminals, turns off a corresponding one of the constant current circuits.

5. The LED driving device according to claim 1, further comprising:
constant current circuits that feed currents to the LEDs in the plurality of channels respectively;
an on/off state input terminal;
an on/off state output terminal; and
an on/off state signal feeder,
wherein
when the on/off state input terminal is used,
if any of the constant current circuits is in an on state or if an on/off state signal input to the on/off state input terminal indicates an on state, the on/off state signal feeder outputs from the on/off state output terminal an on/off state signal indicating an on state and
if all the constant current circuits are in an off state and in addition the on/off state signal input to the on/off state input terminal indicates an off state, the on/off state signal feeder outputs from the on/off state output terminal an on/off state signal indicating an off state, and
when the on/off state input terminal is not used,
if any of the constant current circuits is in an on state, the on/off state signal feeder outputs from the on/off state output terminal an on/off state signal indicating an on state and
if all the constant current circuits are in an off state, the on/off state signal feeder outputs from the on/off state output terminal an on/off state signal indicating an off state.

6. The LED driving device according to claim 5, further comprising:
a DC/DC controller that controls an output stage for generating an output voltage from an input voltage and feeding the output voltage to anodes of the LEDs in the plurality of channels; and
an DC/DC operation on/off controller,
wherein
if any of the constant current circuits is in an on state or if the on/off state signal input to the on/off state input terminal indicates an on state, the DC/DC operation on/off controller makes the DC/DC controller perform DC/DC operation and
if all the constant current circuits are in an off state and in addition the on/off state signal input to the on/off state input terminal indicates an off state, the DC/DC operation on/off controller makes the DC/DC controller suspend the DC/DC operation.

7. The LED driving device according to claim 5, wherein the constant current circuits can be turned on and off based on channel-by-channel PWM dimming settings acquired through communication with outside.

8. An LED light source device, comprising:
an output stage that generates an output voltage from an input voltage;
an LED driving device as a master, including a DC/DC controller for controlling the output stage;
at least one LED driving device as a slave;
wherein each of the LED driving device as a master and the at least one LED driving device as a slave, comprises, respectively:
a plurality of LED terminals to have connected thereto cathodes of LEDs in a plurality of channels respectively;
a lowest voltage input terminal;
a lowest voltage output terminal; and
a selector,
wherein
when the lowest voltage input terminal is used, the selector is operable to select a lowest voltage among voltages at the plurality of LED terminals and a voltage at the lowest voltage input terminal, to output the lowest voltage from the lowest voltage output terminal, and
when the lowest voltage input terminal is not used, the selector is operable to select a lowest voltage among the voltages at the plurality of LED terminals, to output the lowest voltage from the lowest voltage output terminal;
wherein the LED light source device further includes:
a first LED light source provided to correspond to the LED driving device as the master; and
a second LED light source provided to correspond to the at least one LED driving device as the slave;
wherein:
the output voltage is fed to an anode of the first LED light source and to an anode of the second LED light source,
each of the at least one LED driving device as the slave is connected in a stage succeeding the LED driving device as the master or another of the at least one LED driving device as the slave, and
a lowest voltage output terminal of each of the at least one LED driving device as the slave is connected to a lowest voltage input terminal of another of the at least one LED driving device as the slave in a preceding stage or the LED driving device as the master.

9. The LED light source device according to claim 8, wherein
the at least one LED driving device as the slave includes no DC/DC controller.

10. The LED light source device according to claim 8, wherein
the LED driving device as the master and the at least one LED driving device as the slave each include:
an overvoltage detection terminal; and
an open protection circuit that performs LED open protection based on a voltage at the overvoltage detection terminal,
wherein
the overvoltage detection terminal of the at least one LED driving device as the slave is connected to the overvoltage detection terminal of the LED driving device as the master.

11. A lighting device, comprising the LED light source device according to claim 8.

12. A vehicle onboard display device, comprising the lighting device according to claim 11.

13. The LED light source device according to claim 8 wherein the at least one LED driving device as a slave further comprises a DC/DC controller that controls an output stage for generating an output voltage from an input voltage and feeding the output voltage to anodes of the LEDs in the plurality of channels,
wherein the DC/DC controller operates so as to keep, among the voltages at the plurality of LED terminals and the voltage at the lowest voltage input terminal, the lowest voltage selected by the selector equal to a reference voltage.

14. The LED light source device according to claim 9 wherein the at least one LED driving device as a slave further comprises a ground short-circuit protection circuit that, on detecting a ground short circuit at a cathode of any of the LEDs based on the voltage at the lowest voltage input terminal, suspends operation of the DC/DC controller.

15. The LED light source device according to claim 8 wherein the at least one LED driving device as a slave further comprises:
constant current circuits that feed currents to the LEDs in the plurality of channels respectively; and
an LED short-circuit detection circuit that, on detecting a short circuit in any of the LEDs based on the voltages at the LED terminals, turns off a corresponding one of the constant current circuits.

16. The LED light source device according to claim 8 wherein the at least one LED driving device as a slave further comprises:
constant current circuits that feed currents to the LEDs in the plurality of channels respectively;
an on/off state input terminal;
an on/off state output terminal; and
an on/off state signal feeder,
wherein
when the on/off state input terminal is used,
if any of the constant current circuits is in an on state or if an on/off state signal input to the on/off state input terminal indicates an on state, the on/off state signal feeder outputs from the on/off state output terminal an on/off state signal indicating an on state and
if all the constant current circuits are in an off state and in addition the on/off state signal input to the on/off state input terminal indicates an off state, the on/off state signal feeder outputs from the on/off state output terminal an on/off state signal indicating an off state, and
when the on/off state input terminal is not used,
if any of the constant current circuits is in an on state, the on/off state signal feeder outputs from the on/off state output terminal an on/off state signal indicating an on state and
if all the constant current circuits are in an off state, the on/off state signal feeder outputs from the on/off state output terminal an on/off state signal indicating an off state.

17. The LED light source device according to claim 16 wherein the at least one LED driving device as a slave further comprises:
a DC/DC controller that controls an output stage for generating an output voltage from an input voltage and feeding the output voltage to anodes of the LEDs in the plurality of channels; and
an DC/DC operation on/off controller,
wherein
if any of the constant current circuits is in an on state or if the on/off state signal input to the on/off state input terminal indicates an on state, the DC/DC operation on/off controller makes the DC/DC controller perform DC/DC operation and
if all the constant current circuits are in an off state and in addition the on/off state signal input to the on/off state input terminal indicates an off state, the DC/DC operation on/off controller makes the DC/DC controller suspend the DC/DC operation.

18. The LED light source device of according to claim 16 wherein the at least one LED driving device as a slave wherein the constant current circuits can be turned on and off based on channel-by-channel PWM dimming settings acquired through communication with outside.

\* \* \* \* \*